(12) United States Patent
Ejima et al.

(10) Patent No.: US 8,307,624 B2
(45) Date of Patent: Nov. 13, 2012

(54) HELICAL TOOTHED ROPE

(75) Inventors: Kazuyoshi Ejima, Nagoya (JP);
Takazumi Hirooka, Nagoya (JP); Daiki Kimoto, Izumiootsu (JP)

(73) Assignee: Asahi Intecc Co., Ltd., Nagoya-Shi (JP)

( * ) Notice: Subject to any disclaimer, the term of this patent is extended or adjusted under 35 U.S.C. 154(b) by 0 days.

(21) Appl. No.: 13/169,517

(22) Filed: Jun. 27, 2011

(65) Prior Publication Data

US 2012/0103174 A1 May 3, 2012

(30) Foreign Application Priority Data

Oct. 28, 2010 (JP) .................................. 2010-242663

(51) Int. Cl.
*D02G 3/36* (2006.01)
(52) U.S. Cl. ....................................................... 57/232
(58) Field of Classification Search .................... 57/210, 57/212, 218, 221, 223, 232
See application file for complete search history.

(56) References Cited

U.S. PATENT DOCUMENTS

| | | | | |
|---|---|---|---|---|
| 3,716,982 A | * | 2/1973 | Morohashi et al. | 57/212 |
| 3,805,508 A | * | 4/1974 | Maderna | 57/212 |
| 3,991,550 A | * | 11/1976 | Cohen | 57/212 |
| 4,240,486 A | * | 12/1980 | Schmit et al. | 152/152 |
| 4,449,353 A | * | 5/1984 | Tayebi | 57/242 |
| 4,620,401 A | * | 11/1986 | L'Esperance et al. | 52/309.15 |
| 5,473,877 A | * | 12/1995 | Hamacher | 57/212 |
| 6,779,950 B1 | * | 8/2004 | Hutchins | 405/259.1 |
| 7,147,904 B1 | * | 12/2006 | Crawford | 428/36.1 |
| 7,472,535 B2 | * | 1/2009 | Schwartz | 57/238 |
| 2002/0029554 A1 | * | 3/2002 | Belcher et al. | 57/333 |
| 2006/0179811 A1 | * | 8/2006 | Hughes | 57/210 |

FOREIGN PATENT DOCUMENTS

| | | |
|---|---|---|
| JP | A-06-005127 | 1/1994 |
| JP | A-2004-239347 | 8/2004 |
| JP | A-2008-230224 | 10/2008 |

OTHER PUBLICATIONS

Aug. 10, 2012 Office Action issued in Japanese Patent Application No. 2010-242663 (with translation).

* cited by examiner

*Primary Examiner* — Shaun R Hurley
(74) *Attorney, Agent, or Firm* — Oliff & Berridge, PLC

(57) ABSTRACT

A helical toothed rope includes a rope body including a first resin coating and a linear body including a second resin coating. The linear body is wound around the outer surface of the rope body, and the second resin coating is fusion-bonded to the first resin coating.

5 Claims, 1 Drawing Sheet

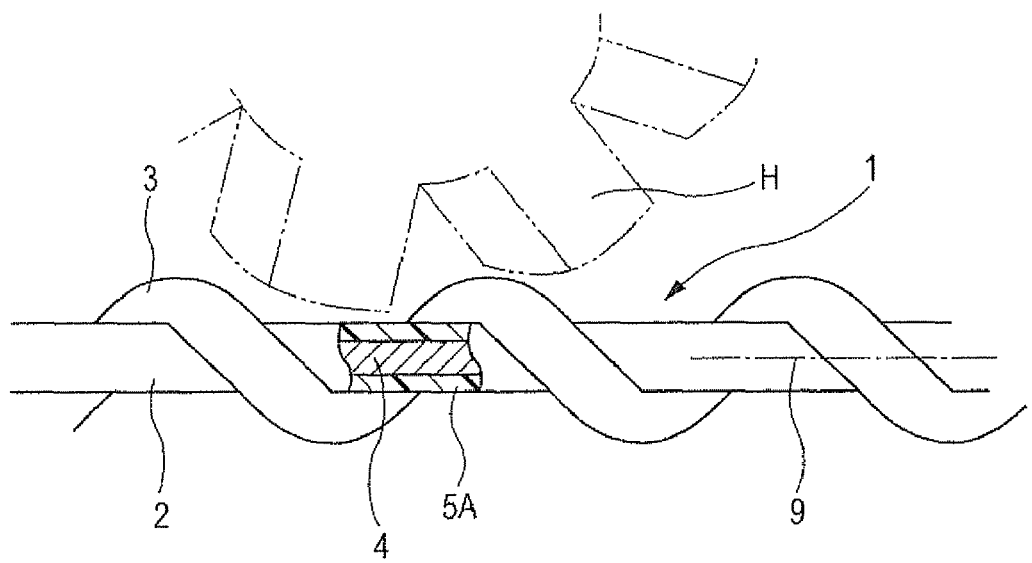
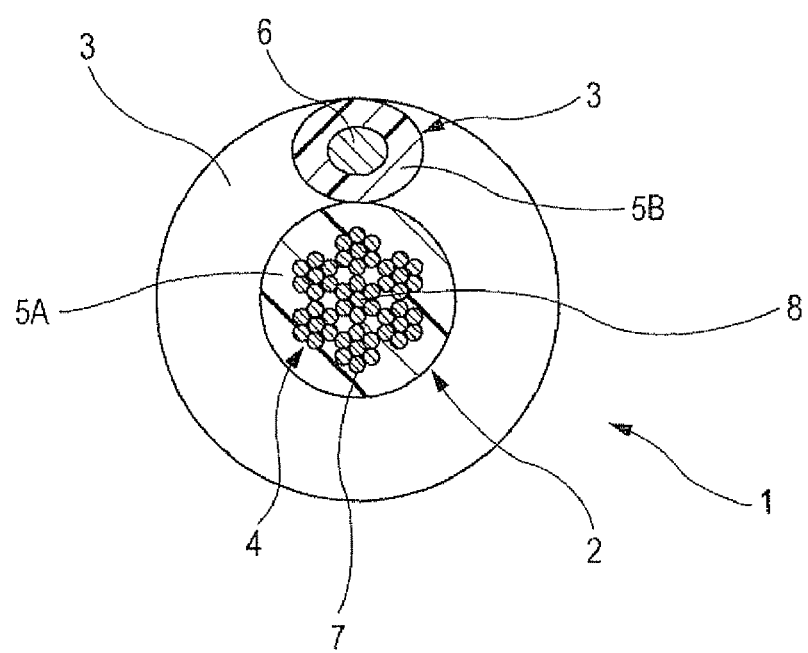

HELICAL TOOTHED ROPE

BACKGROUND OF THE INVENTION

1. Field of the Invention

The present invention relates to, for example, a helical toothed rope used to quietly and accurately move a movable member, such as a carriage or a scanner, in a printer.

2. Description of the Related Art

Helical toothed ropes are used to quietly and accurately move a movable member, such as a carriage or a scanner, in a printer.

Japanese Unexamined Patent Application Publication No. 2004-239347 describes a helical toothed rope including a rope body and a linear body wound around the outer surface of the rope body. The rope body is formed by coating a wire rope that serves as a core with a resin coating. The linear body is formed by coating a core with a resin coating.

SUMMARY OF THE INVENTION

In the helical toothed rope described in Japanese Unexamined Patent Application Publication No. 2004-239347, the rope body and the linear body are bonded together with an adhesive, and the adhesive is always required. In addition, a process of manufacturing the helical toothed rope necessarily includes the step of applying the adhesive to the rope body or the linear body.

The helical toothed rope meshes with a gear to transmit a driving force generated by, for example, a motor to the gear. Therefore, it is necessary that the helical toothed rope be shaped such that the driving force of the motor or the like can be transmitted to the gear in the state in which the linear body is fixed to the rope body in the helically wound manner.

Noise generated when the helical toothed rope meshes with the gear is preferably as low as possible.

In light of the above-described situation, an object of the present invention is to provide a helical toothed rope that can be easily manufactured without using an adhesive and a helical toothed rope capable of reliably transmitting a driving force to a gear while suppressing noise generated when the helical toothed rope meshes with the gear.

To achieve the above-described object, according to an aspect of the present invention, a helical toothed rope includes a first rope including a coating of first thermoplastic resin; and a second rope including a coating of second thermoplastic resin. The second rope is helically wound around the outer surface of the first rope, and the second thermoplastic resin is fusion-bonded to the first thermoplastic resin.

According to the aspect of the present invention, since the second thermoplastic resin is fusion-bonded to the first thermoplastic resin, the helical toothed rope can be easily manufactured by a simple step of fusion bonding without using an adhesive.

BRIEF DESCRIPTION OF THE DRAWINGS

FIG. 1 is a partial front view illustrating the manner in which a helical toothed rope according to an embodiment of the present invention is used.

FIG. 2 is a cross sectional view of the helical toothed rope according to the embodiment.

DESCRIPTION OF THE PREFERRED EMBODIMENTS

A helical toothed rope 1 according to an embodiment of the present invention will be described below with reference to the drawings.

FIG. 1 is a partial front view illustrating the manner in which the helical toothed rope 1 according to the embodiment of the present invention is used. FIG. 2 is a cross sectional view of the helical toothed rope 1 according to the embodiment.

Referring to FIG. 1, the helical toothed rope 1 includes a rope body 2 (which corresponds to a first rope according to the present invention) and a linear body 3 (which corresponds to a second rope according to the present invention) wound around the outer surface of the rope body 2. The rope body 2 is formed by coating a wire rope 4 that serves as a core with a resin coating 5A (which corresponds to a first thermoplastic resin in the present invention). The linear body 3 is formed by coating a linear member 6 that serves as a core with a resin coating 5B (which corresponds to a second thermoplastic resin in the present invention).

The wire rope 4 that serves as the core of the rope body 2 has a "7×7 multi-strand structure" in which six outer strands 7 are twisted around the outer surface of a core strand 8. The core strand 8 includes seven austenitic stainless steel wires that are twisted together, and each outer strand 7 also includes seven austenitic stainless steel wires that are twisted together. The resin coating 5A, which is made of nylon 12, is provided on the outer surface of the wire rope 4.

The linear member 6 that serves as the core of the linear body 3 is made of the same austenitic stainless steel as that used in the rope body 2. The resin coating 5B, which is also made of nylon 12, is provided on the outer surface of the linear member 6.

The linear body 3 is wound around the outer surface of the rope body 2 such that the "direction in which the outer strands 7 are twisted" and the "direction in which the linear body 3 is wound around the rope body 2" with respect to the center line 9 of the helical toothed rope 1 are opposite to each other. The rope body 2 and the linear body 3 are fusion-bonded together by melting both the resin coating 5A and the resin coating 5B, by melting only the resin coating 5A, or by melting only the resin coating 5B. The linear body 3 is preferably fusion-bonded to the rope body 2 by melting both the resin coating 5A and the resin coating 5B. In such a case, the second rope is reliably fixed to the first rope and is prevented from being displaced from the first rope when the second rope meshes with a gear.

In the present embodiment, the resin coating 5A included in the rope body 2 and the resin coating 5B included in the linear body 3 are directly fusion-bonded together. Therefore, unlike the helical toothed rope according to the related art, it is not necessary to use an adhesive. In addition, the helical toothed rope 1 can be manufactured without performing the step of applying an adhesive to the rope body 2 or the linear body 3. The helical toothed rope 1 can be manufactured simply by helically winding the linear body 3 around the rope body 2, and then causing the linear body 3 and the rope body 2 in this state to pass through an environment where the temperature is set to a certain temperature or irradiating contacting portions of the resin coating 5A and the resin coating 5B with far-infrared rays. Thus, the process of manufacturing the helical toothed rope is simplified.

The helical toothed rope 1 applies an operational force to a gear H through the linear body 3. Therefore, the linear body 3 must be shaped such that the operational force can be transmitted to the gear H after the linear body 3 is fusion-bonded to the rope body 2.

More specifically, although the adhesive can be saved and the manufacturing process can be simplified when the resin coating 5A included in the rope body 2 and the resin coating 5B included in the linear body 3 are directly fusion-bonded together, there is a possibility that the shape of the resin coating 5B will change when the resin coating 5A and the resin coating 5B melt.

As a result of various studies conducted by the inventors of the present invention, it was found that the shape of the resin coating 5B does not largely change after the melting process if the resin coating 5B is softer than the resin coating 5A at an ordinary temperature and has a higher viscosity than that of the resin coating 5A in a molten state.

In particular, the resin coating 5B and the resin coating 5A were easily fusion-bonded together without changing the shape of the resin coating 5B when the resin coating 53 and the resin coating 5A were made of the following materials. That is, the resin coating 5B was made of nylon having plasticizer contained therein (hereinafter referred to as plasticizer-containing nylon), and the resin coating 5A was made of mixed resin of the plasticizer-containing nylon and resin containing less plasticizer than the plasticizer content in the plasticizer-containing nylon.

In the present embodiment, the resin coating 5B and the resin coating 5A are made of nylon 12. Nylon 12 has high melting characteristics and high flexibility, and is suitable for use as a material of the helical toothed rope 1 of the present embodiment.

As an example, the helical toothed rope 1 according to the present embodiment was moved while the helical toothed rope 1 was meshed with the gear H. As a result, no tooth jumping occurred.

Although the resin coating 5A and the resin coating 53 according to the present embodiment are made of nylon 12, it is not necessary to use nylon 12. Any type of thermoplastic resin, such as polyimide elastomer, polyurethane, polyurethane elastomer, polyester, and polyester elastomer, may be used.

The structure of the wire rope 4 in the rope body 2 (number of wires and combinations thereof) and the structure of the linear member 6 in the linear body 3 (number of wires and combinations thereof) may be set arbitrarily.

When the outer diameter of the wire rope 4 is larger than that of the linear member 6, high rigidity of the helical toothed rope 1 can be ensured.

The present invention contains subject matter related to Japanese Patent Application No. 2010-242663 filed in the Japan Patent Office on Oct. 28, 2010, the entire contents of which are incorporated herein by reference.

What is claimed is:

1. A helical toothed rope comprising:
   a first rope including a coating of first thermoplastic resin; and
   a second rope including a coating of second thermoplastic resin,
   wherein the second rope is helically wound around the outer surface of the first rope,
   wherein the second thermoplastic resin is fusion-bonded to the first thermoplastic resin, and
   wherein the second thermoplastic resin is softer than the first thermoplastic resin in an ordinary temperature and has a higher viscosity than a viscosity of the first thermoplastic resin in a molten state.

2. The helical toothed rope according to claim 1,
   wherein the second thermoplastic resin is fusion-bonded to the first thermoplastic resin by melting both the first thermoplastic resin and the second thermoplastic resin.

3. The helical toothed rope according to claim 1,
   wherein the first thermoplastic resin and the second thermoplastic resin are nylon 12.

4. A helical toothed rope comprising:
   a first rope including a coating of first thermoplastic resin; and
   a second rope including a coating of second thermoplastic resin,
   wherein the second rope is helically wound around the outer surface of the first rope,
   wherein the second thermoplastic resin is fusion-bonded to the first thermoplastic resin, and
   wherein the second thermoplastic resin is a plasticizer-containing resin that contains plasticizer and the first thermoplastic resin is a mixed resin of the plasticizer-containing resin and resin containing less plasticizer than a plasticizer content in the plasticizer-containing resin.

5. The helical toothed rope according to claim 4,
   wherein the first thermoplastic resin and the second thermoplastic resin are nylon 12.

* * * * *